United States Patent Office 3,049,916
Patented Aug. 21, 1962

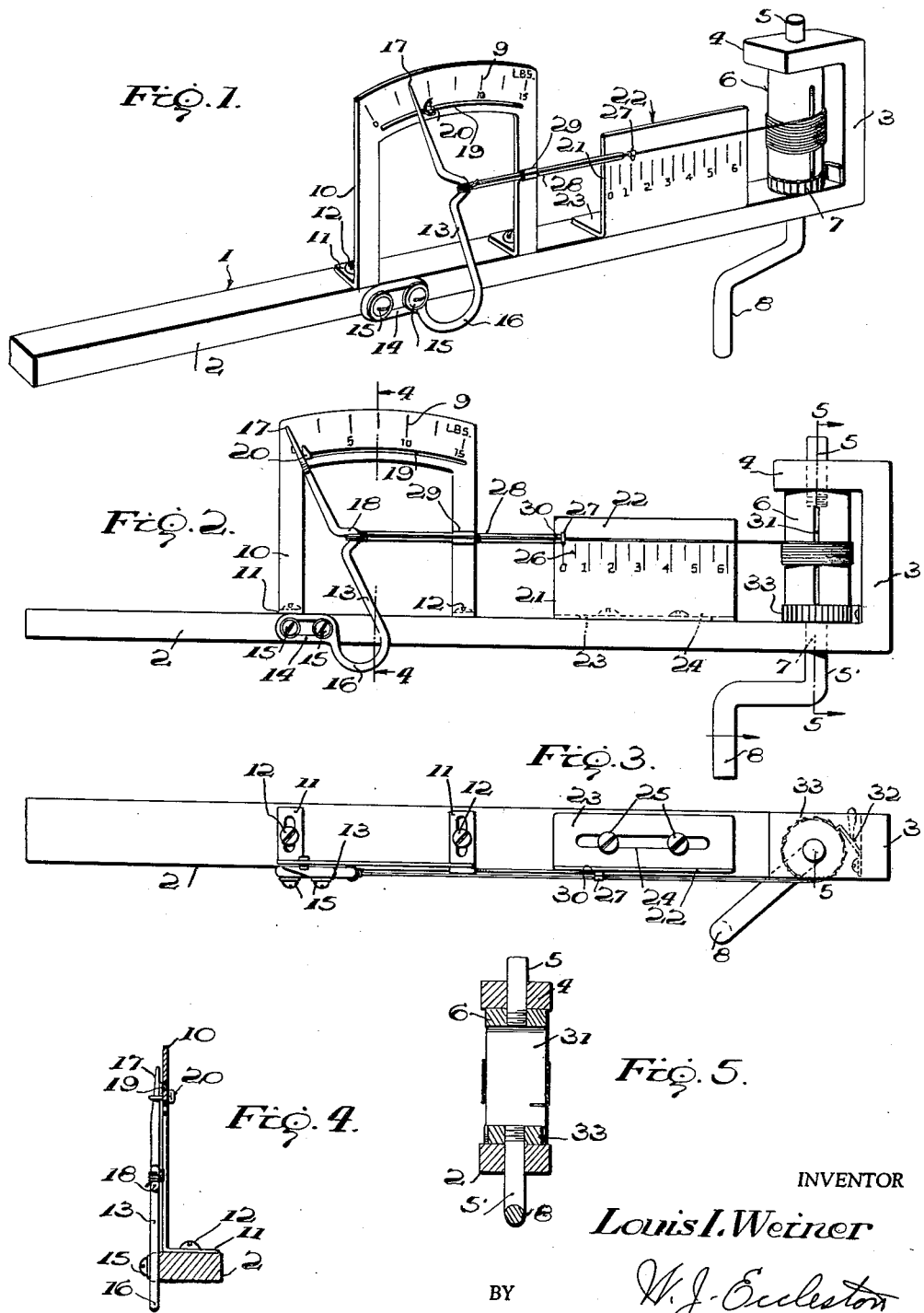

3,049,916
POCKET-SIZE TESTER FOR YARN, THREADS
AND THE LIKE
Louis I. Weiner, West Newton, Mass., assignor to the United States of America as represented by the Secretary of the Army
Filed Mar. 27, 1959, Ser. No. 802,584
9 Claims. (Cl. 73—95)
(Granted under Title 35, U.S. Code (1952), sec. 266)

The invention described herein, if patented, may be manufactured and used by or for the Government for governmental purposes, without the payment to me of any royalty thereon.

This invention relates to measuring and testing instruments and has for its primary object to provide a device of that type for measuring the stress-strain properties, that is, the strength, elongation, energy required to rupture, etc., of linear textile structures such as yarns, threads, monofilaments, braid, and cord.

A further object of the invention consists in providing such an instrument of substantially pocket size and simple construction and yet one which is extremely accurate in measuring the qualities of the threads, etc., being tested taking into consideration the simple construction of the improved instrument of the present invention.

Another object of the invention consists in the provision of a testing instrument for threads, cords and the like which will simultaneously measure the breaking strength of the item being tested and the extent of stretch of the item.

Other objects and advantages of the invention will be apparent from the following description taken in connection with the accompanying drawings, in which, FIG. 1 is a perspective view of the pocket-size tester showing the same in operation;

FIG. 2 is a front elevational view of the tester prior to applying tension to the thread;

FIG. 3 is a bottom plan view of the device; and

FIGS. 4 and 5 are vertical sectional views taken on the lines 4—4 and 5—5, respectively, of FIG. 2.

Referring to the drawings in greater detail and by reference numeral, the L-shaped metal frame is indicated by the numeral 1, and is preferably formed of an elongated bar of rectangular cross section. This frame comprises a longer arm 2 which may approximate the width or depth of a coat pocket and terminates in an upturned portion 3 and an overhanging arm 4 which serves as one of the bearings for a stub shaft 5 threaded into a drum 6 for applying tension to the thread being tested. Another stub shaft 5' threaded into the lower end of the drum 6 is seated in a bearing 7 at the adjacent end of the elongated bar portion 2, and is provided with a crank arm 8.

Secured to the portion 2 of the frame intermediate its length is an avoirdupois scale indicated at 9 on the upper portion of an inverted U-shaped frame 10, the legs of which are provided with flattened slotted portions 11 by means of which it may be adjustably attached to the upper flat face of the frame portion 2 as by screws 12. The avoirdupois scale 9 is calibrated in pounds or fractions thereof to indicate the force applied to the thread being tested, but other suitable units may be employed. The force bar for measuring the tensile strength of the thread is indicated by the numeral 13 and comprises a strip of spring metal having a flattened portion 14 which is applied to a side of the bar 2 adjacent the U-shaped frame 10 and is fixedly secured thereto by a pair of machine screws 15. The bar 13 may be formed of heat-treated music wire, or, in fact, of any material which obeys Hooke's law over the range of applicability of the instrument. This force bar is curved upwardly as indicated by the numeral 16, and normally has its pointed portion 17 registering with the zero graduation of the avoirdupois scale indicated in FIG. 2. The body portion of the force bar is provided with some means by which an end of the thread to be tested may be attached, and in the present illustration an integral V-shaped bend 18 is formed in the bar for that purpose.

The scale 9—10 is provided with an elongated slot 19 extending just below the graduations and throughout the extent thereof and slidably but fixedly mounted therein is a marker 20 which is operatively associated with the pointer 17, and serves to indicate the amount of tension applied to the cord or thread being tested, as clearly indicated in FIG. 1. Mounted on the upper flat surface of the frame bar 2 between the scale 9—10 and the drum 6 is a linear scale 21 which comprises a L-shaped strip of metal formed of a longer arm 22 and a shorter arm 23, the latter being slotted for the purpose of adjustment, as indicated by the numeral 24, and being attached to the upper surface of the bar 2 by means of machine screws 25. The longer arm 22 of the linear scale 21 is provided with graduations 26 representing fractions of an inch for the purpose of indicating the maximum stretch or elongation of the thread prior to its rupture.

The elongation of the thread may be measured by merely attaching a marker clip 27 to the thread at the zero marking of the linear scale prior to applying tension to the thread so that clip 27 will be carried forward, i.e. to the right in FIG. 2, by the thread a distance corresponding to the sum of the movement of the thread due to translation resulting from yielding of the resilient force bar or pointer 13 plus the amount the thread elongates as a result of the pull applied thereto by the drum 6. This marker is shown as in contact with the end of a bar 28 which is slidably mounted in a cylindrical sleeve or bearing formed on or secured to the adjacent leg of the avoirdupois scale 9—10 and indicated by the numeral 29. The length of the bar 28 is such that its pointed end 30 will contact the marker clip 27 located at the zero position on the linear scale, while the opposite end of the bar 28 will abut the base of the V-shaped bend 18 of the force bar 13. Therefore, as the pointer 17 travels across the avoirdupois scale 9 due to tension applied to the cord through the medium of the rotatable drum 6, the bar 28—30 will be pushed through the bearing 29 and its pointer end 30 will travel forward, i.e. to the right in FIG. 2, until such time as the thread is snapped due to excessive tension applied by the drum 6. The total forward travel of the pointer 30 correspond to the total translatory movement of the thread which results from yielding of the force bar or pointer 13 as a result of the pull applied thereto by the thread. It is to be noted, however, that the marker 27 will travel a greater distance than the pointer due to the elongation of the thread, the additional distance this marker clip travels being visually observed on the scale 26. After the thread has snapped, the force bar 13 will of course automatically return to its initial position with the pointer 17 registering with the zero graduation on the scale 9. However, bar 28—30 will remain in the position of its maximum movement prior to the snapping of the thread due to the slight frictional restraint afforded by the bearing 29 while the marker 27 which is merely lightly clipped to the thread will drop from the same when the thread breaks. It will be understood, therefore, that the amount the thread elongates under the tension applied by the drum 6 corresponds to the difference between the point of maximum advance of the marker clip 27 on scale 26 as visually observed immediately prior to snapping of the thread and the point of maximum advance of the pointer 30 as also indicated on the scale 26 after the thread snaps.

The drum 6 is provided with a slot 31 in the present illustration through which the cord to be tested may be threaded as one means of fixedly attaching the cord to the drum; other means for attaching the thread may, of course, be substituted. In order to prevent slippage of the drum while the end of the thread is being attached thereto, a suitable pawl and ratchet 32 and 33 may be provided, the pawl being attached to the arm 3 and the ratchet being formed on the lower end of the drum 6.

From the foregoing description taken in connection with the accompanying drawings, it will be apparent to those skilled in the art that I have devised an exceedingly simple and inexpensive pocket-size thread tester which is capable of simultaneously measuring both the tensile strength and the elongation of a thread applied thereto, that indicators are associated with the avoirdupois scale and the linear scale so that even after the testing material is ruptured, the scales will clearly show both the amount of tension applied to the thread as well as the extension or elongation of the thread at the time of its breaking, and that the several scales are adjustably mounted on the frame so as to change them in accordance with various types of samples having very substantial differences in strength and elongation factors.

In accordance with the patent statutes, I have described what I now consider to be the preferred form of the invention, but since various minor changes may be made in structural details without departing from the spirit of the invention, it is intended that all such changes be included within the scope of the appended claims.

I claim:
1. A device for testing the tensile strength of thread or the like comprising a frame member, a member conformed along a portion thereof to define an elongated pointer, means for rigidly anchoring said pointer forming member adjacent one end thereof upon said frame member, said pointer forming member being formed of spring metal so that a predetermined resistance to deflection is exerted by the free end of an anchored pointer, means on said frame member remote from said pointer for applying pull to a thread or the like anchored to said pointer thereby to deflect the latter, a first indicating member advanced by said pointer during deflection thereof a distance corresponding to the translatory dislocation of the thread to which pull is applied, a second indicating member advanced by said thread during the application of pull thereto a distance corresponding to the combined translatory dislocation and the elongation of the said thread and scales upon which the deflection of said pointer is indicated and both the translatory dislocation and the combined translatory dislocation and elongation of said thread are indicated by said indicating members.

2. A testing device as defined in claim 1 wherein said pointer forming member has a resilient bowed portion between the portion thereof which is anchored to said frame member and the elongated pointer forming portion to increase the resilience and hence the range of flexibility thereof.

3. A testing device as defined in claim 2 wherein the pointer forming portion of said pointer forming member is formed to define an integral notch to locate the point at which thread to be tested should be anchored to said pointer and to prevent accidental slippage of the anchored thread from that position.

4. A testing device as defined in claim 1 wherein the scale on which said pointer registers is calibrated in units of weight and the scale on which said first and second indicating members register is calibrated in units of length.

5. A testing device as defined in claim 1 wherein said frame member is elongated and has a rebent end and the means for applying pull to said thread comprises a drum rotatably mounted in the opposed portions formed by said rebent end substantially aligned with the said pointer.

6. A device for testing the tensile strength of thread or the like comprising a frame member, a member conformed along a portion thereof to define an elongated pointer, means for rigidly anchoring said pointer forming member adjacent one end thereof upon said frame member, said pointer forming member being formed of spring metal of predetermined flexibility so that a predetermined resistance to deflection is exerted by the free end of an anchored pointer, means remote from said pointer for applying pull to a thread or the like anchored to said pointer thereby to deflect the latter, an elongated first indicating member, means to mount said first indicating member for forward movement in an endwise direction in response to deflection of said pointer by pull on said thread, a second indicating member advanced by the thread under test in response to both translation and elongation of said thread and scales upon which the deflection of said pointer is indicated and the movement of said first and second indicating members registers.

7. A testing device as defined in claim 6 wherein said first and second indicating members register on the same scale.

8. A testing device as defined in claim 6 wherein said second indicating member is a marker clip releasably clipped upon said thread at the zero position while the said thread is taut but free of pull sufficient to cause translation or elongation thereof.

9. A testing device as defined in claim 6 wherein said pointer and first elongated indicating member are free of direct connection to each other but abuttingly engage in such manner that the said first indicating member is advanced during advance of the pointer but is not retracted from advanced position by return of the pointer to zero position.

References Cited in the file of this patent

UNITED STATES PATENTS

| | | |
|---|---|---|
| 201,802 | Lee | Mar. 26, 1878 |
| 331,802 | Lumis | Dec. 8, 1885 |
| 464,766 | Wendler | Dec. 8, 1891 |
| 673,526 | Moore | May 7, 1901 |

FOREIGN PATENTS

| | | |
|---|---|---|
| 40,160 | Austria | Dec. 27, 1909 |